May 9, 1939.  J. H. JEFFERY ET AL  2,157,339
APPARATUS FOR CONVEYING PARTICULATE MATERIALS
Filed May 28, 1937  3 Sheets-Sheet 2
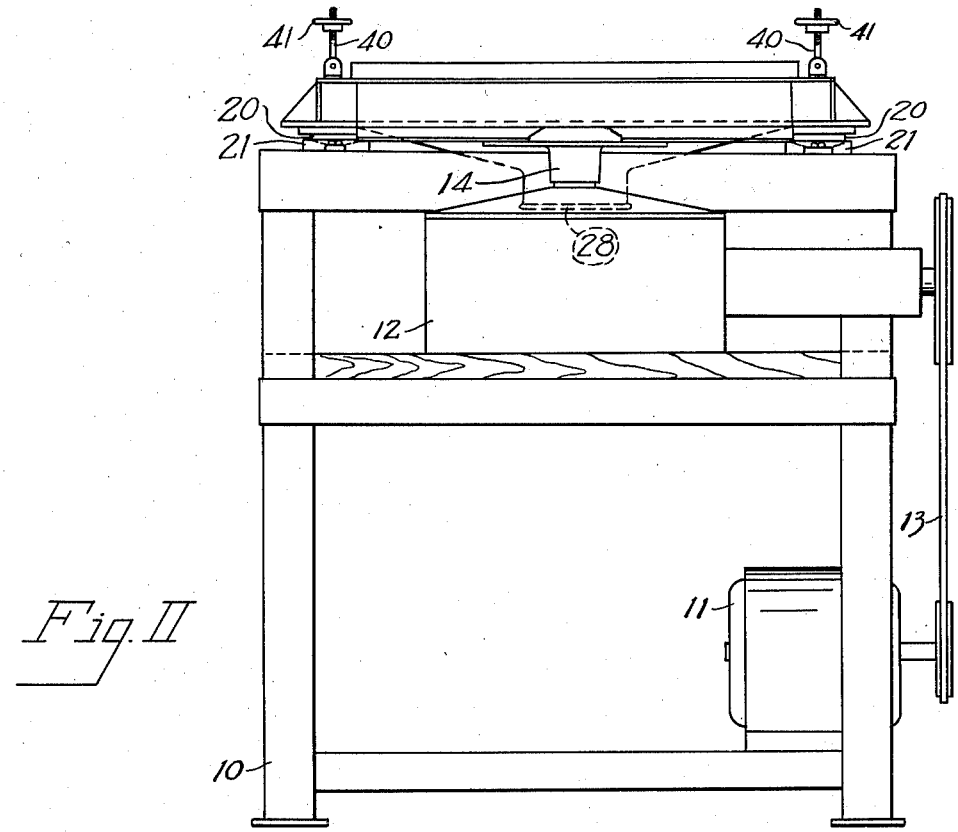
Fig. II
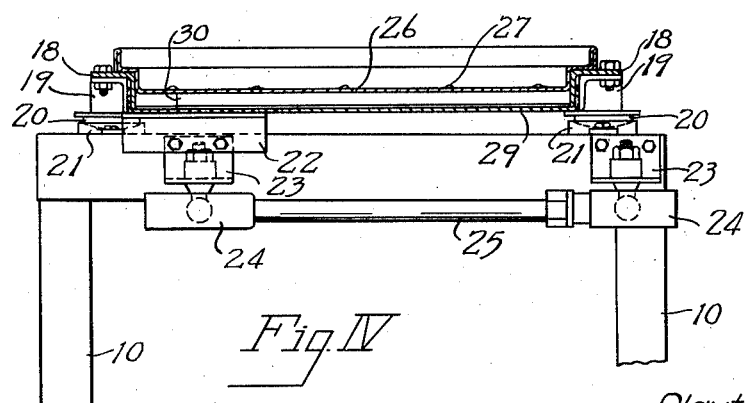
Fig. IV
Clayton B. Matt
James H. Jeffery
INVENTORS
BY Marshall and Marshall
ATTORNEYS

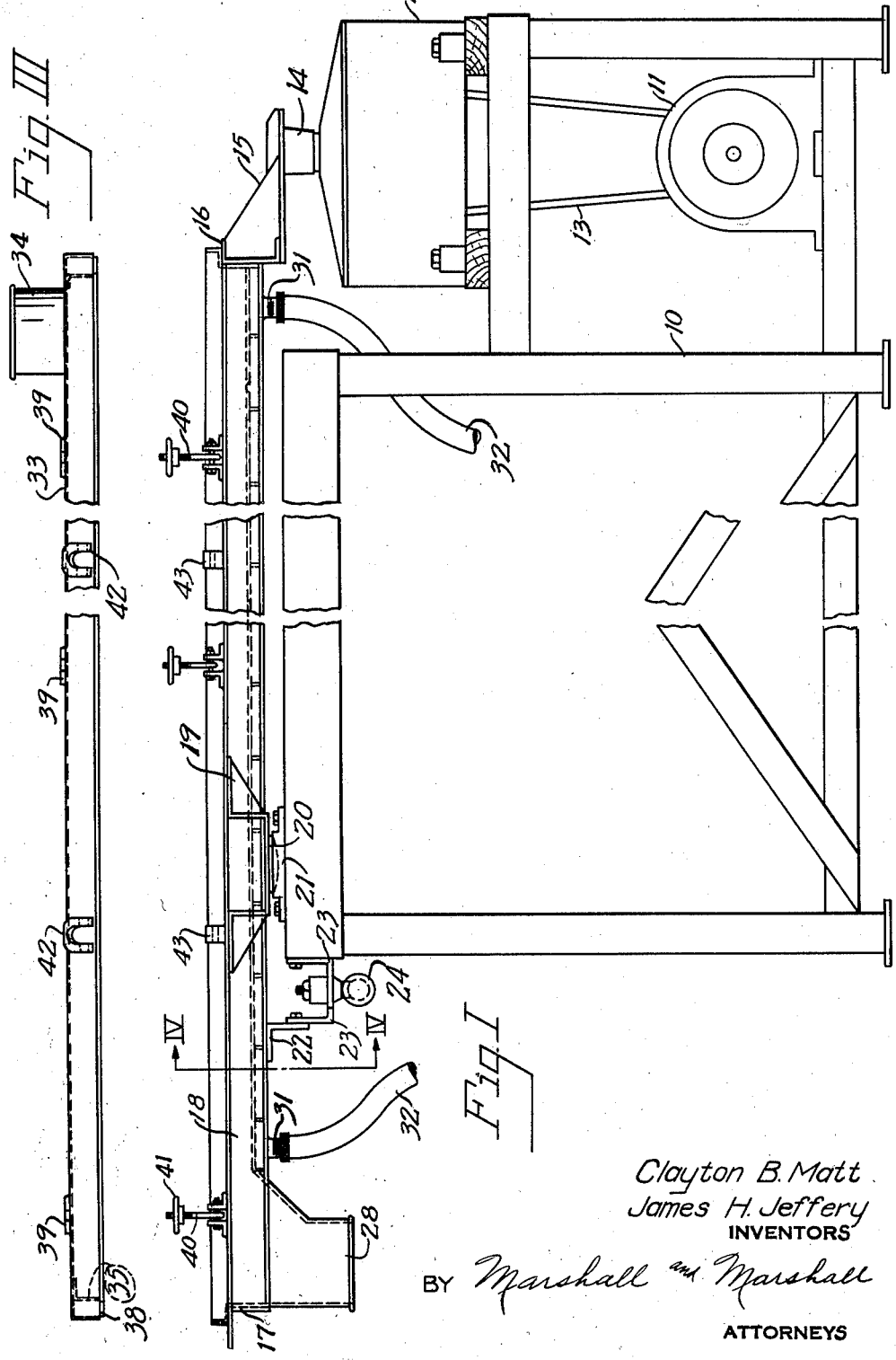

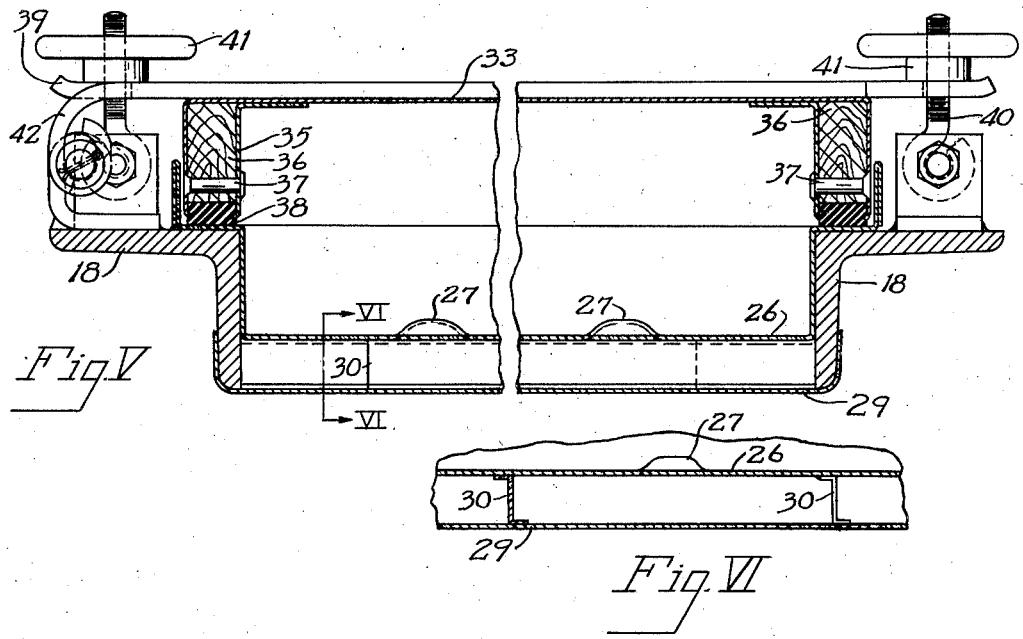
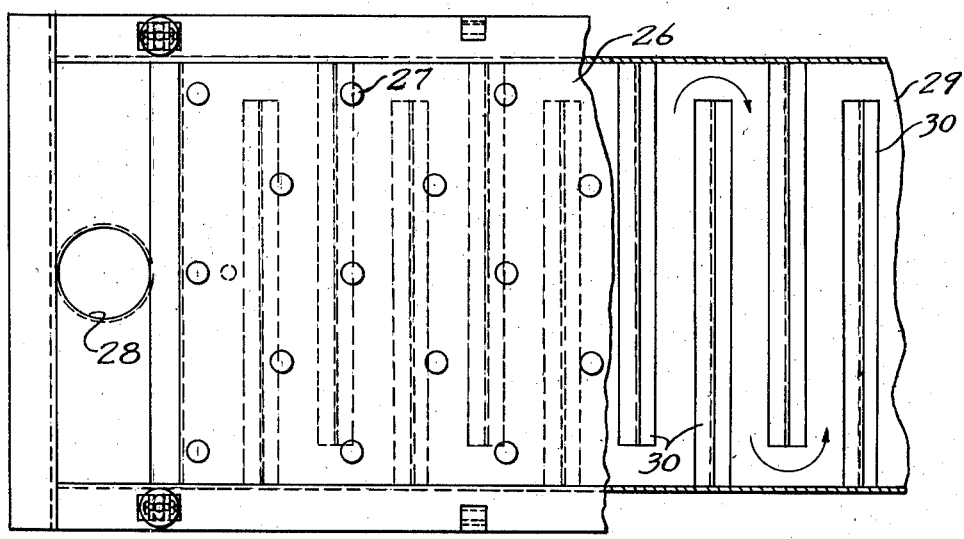

Patented May 9, 1939

2,157,339

UNITED STATES PATENT OFFICE 2,157,339

APPARATUS FOR CONVEYING PARTICULATE MATERIALS

James H. Jeffery and Clayton B. Matt, Toledo, Ohio, assignors to Plaskon Company, Incorporated, Toledo, Ohio, a corporation of Delaware Application May 28, 1937, Serial No. 145,308

3 Claims. (Cl. 198—220)

The invention relates to apparatus for treating particulate materials, and more specifically to a conveyor for such materials which may include an arrangement for heating or cooling materials. Its principal object is to provide a conveyor of simple construction which operates in a highly efficient manner.

Further objects and advantages are apparent from the description, in which reference is had to the accompanying drawings illustrating a preferred embodiment of the invention.

Figure I is a side elevation of the preferred form of conveyor.

Figure II is an end elevation thereof.

Figure III is a side elevation of the cover.

Figure IV is a fragmentary vertical section on the line 4—4 of Figure I.

Figure V is a vertical section of the conveyor proper on a larger scale.

Figure VI is a fragmentary vertical section on the line 6—6 of Figure V.

Figure VII is a fragmentary plan of the conveyor.

These specific drawings and the specific description that follows are to disclose and illustrate the invention, and are not to impose limitations on the claims.

In a vibratory conveyor having a generally planar conveying surface there is somewhat of a tendency for the fine particles of material to travel more slowly along the conveyor than the larger particles, so that the material initially leaving the conveyor consists mainly of large particles. During the operation of the device the finer particles accumulate in the conveyor, and the last increment of material delivered after the supply of material to the conveyor is cut off is made up of fine particles. This situation may be quite disadvantageous when the materials are heated or cooled as they pass along the conveyor, because the heating or cooling of the swiftly flowing large particles is very inefficient.

In accordance with the present invention, projections are embossed on or secured to the conveying surface which are preferably in the shape of rounded studs, although they may consist of ridges or flanges, arranged in staggered relation transversely to the flow of material, or in any desired manner. It has been discovered that these projections retard the large particles and prevent them from flowing substantially faster than smaller particles when the conveyor is vibrated.

The studs or staggered projections have space for the passage of material at the sides thereof.

In the operation of the conveyor, it should not be loaded with material so heavily that a bottom layer of fine particles is formed which completely submerges the projections. The projections do not materially impede the flow of the fine particles, but they project through the layer of fine particles, so that the large particles strike them and are retarded. The movement of the large particles does not need to be reduced to the same speed as the fine particles; but their movement should be retarded sufficiently to permit them to be heated or cooled satisfactorily by a heat-exchange fluid in contact with the bottom of the conveyor.

For heating or cooling the material in the conveyor, the invention contemplates the use of thermally conducting material for the conveying surface, and a jacket below this sheet of thermally conducting material, preferably constructed by welding a pair of bars along the sides of the conducting sheet and welding a second sheet to the bars below the first sheet to form the enclosure for the heat-exchange fluid. It has been found that the welding is much more satisfactory when the two sheets are welded to the bars than when the bottom sheet, or trough, is welded to the top sheet. Moreover, the bars provide a reinforcing frame for the structure which makes it stand up indefinitely under constant vibration.

The cover of the chute is preferably connected thereto by hinges so that the cover can be opened and closed conveniently, and the hinges are preferably provided with lost motion to facilitate clamping of the cover in dust-tight relationship with the chute.

In the illustrated embodiment, the base 10 supports the driving motor 11 and a suitable transmission 12, connected to the motor by means of a belt 13. Driven with a rotary movement by the transmission 12 is an eccentric stud 14 upon which is mounted a bracket 15 that supports the end channel 16 of the conveyor frame. The other end member of the conveyor frame consists of an angle bar 17, and the side members of the frame are longitudinal angle bars 18 (see Figure IV). Depending from the longitudinal bars 18 are a pair of brackets 19 provided with machined lower surfaces. Each of the surfaces is adapted to slide upon the machined upper face of a mounting block 20, the lower side of which is spherical and fits in a spherical socket 21 secured to the base 10. From one side of the conveyor depends an angle bracket 22 on which is mounted a bearing member 23 that is fitted with a cooperating member resiliently mounted inside a casing 24 to form a ball and socket joint. The casing 24 is connected by means of an arm 25 of adjustable length to a similar casing 24 which cooperates with a second bearing member 23 secured to the base 10 to form another ball and socket joint.

The arm 25 prevents the angle bracket 22 from having any other movement than substantially linear reciprocation while the eccentric stud 14 is moving in a rotary manner to vibrate the conveyor. The movement of the portion of the conveyor that extends from the stud 14 to the angle bracket 22 is therefore similar to the motion of a connecting rod in an engine. Because of this movement of the conveyor, particles therein flow from the end of the conveyor adjacent the stud 14 to the portion of the conveyor adjacent the angle bracket 22. The transmission 12 for driving the eccentric stud 14 may be of the type usually employed for vibratory conveyors.

Welded to the longitudinal bars 18, the channel 16, and the angle bar 17, is a sheet metal trough 26 along which the material is conveyed. The rounded projections 27 on the conveying surface of the trough prevent large particles from flowing substantially faster than smaller ones. At the discharge end of the conveyor, the trough 26 is formed with a depending discharge spout 28.

A bottom sheet 29 is welded to the frame members below the trough 26 to form an enclosure for a heat-exchange fluid such as water or steam. Z-shaped baffles 30 space the bottom sheet 29 from the longitudinal trough and cause the heat-exchange fluid to follow a tortuous path, which is preferably countercurrent to the flow of material in the conveyor. Depending from the bottom sheet 26 are two nipples 31 for attachment to rubber hoses 32 that conduct the heat-exchange fluid.

Projecting from the pan-shaped cover 33 is a feed spout 34 through which the material enters the conveyor. Both the feed spout 34 and discharge spout 28 may be connected to a dust-proof fabric sleeve, through which the material flows by gravity. Extending around the periphery of the cover inside the pan 33 is a flange 35 that is spaced from the sides of the pan 33 by means of wooden strips 36. A number of rivets 37 grip the flanges 35 against the wooden strips 36 to hold a rubber gasket 38 in place along the lower edge of the cover. Welded across the top of the cover at intervals are clamping straps 39 that are forked at both ends. To fit into the forked ends of the clamping straps 39, suitable clamps 40 are pivoted at intervals along the longitudinal bars 18, and a clamp nut 41 is threaded onto each clamp so that the cover may be held in dust-tight relationship with the conveyor.

Hinge straps 42 are also welded to the top of the cover and their ends are bent into oval-shaped loops. These loops fit loosely around the hinge pins that are mounted in the hinge members 43 on the longitudinal bar so that the cover 33 may be clamped down tightly enough to compress the gasket 38.

Changes in the illustrated embodiment may be made, and other embodiments of the substance of the invention may be devised to meet various requirements.

Having described our invention, we claim:

1. A conveyor for particulate material in which the particle sizes vary widely comprising, in combination, a substantially horizontal conveying chute having a generally planar conveying surface thickly studded with rounded projections adapted to project through a layer of fine particles and retard the flow of large particles, space for the passage of material being provided at the sides of said projections, and means for vibrating the chute to cause the material to flow along it.

2. A conveyor for particulate material comprising, in combination, a conveying chute, a dust-tight cover for the chute, clamps for forcing the cover tightly against the chute, and a hinge connecting one side of the cover to the chute, having lost motion to allow proper operation of the clamps.

3. A conveyor for particulate material in which the particle sizes vary widely comprising, in combination, a substantially horizontal conveying chute having a generally planar conveying surface, retarding projections on said surface adapted to project through a layer of fine particles and retard the flow of large particles, space for the passage of material being provided at the sides of said projections, and means for vibrating the chute to cause the material to flow along it.

JAMES H. JEFFERY.
CLAYTON B. MATT.